(12) United States Patent
Roehle et al.

(10) Patent No.: US 8,546,762 B1
(45) Date of Patent: Oct. 1, 2013

(54) METHOD AND ARRANGEMENT FOR CARRYING OUT TIME-DOMAIN MEASUREMENTS

(75) Inventors: Helmut Roehle, Berlin (DE); Bernd Sartorius, Berlin (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 13/538,554

(22) Filed: Jun. 29, 2012

(51) Int. Cl.
*G01J 5/02* (2006.01)

(52) U.S. Cl.
USPC ..................................................... 250/341.1

(58) Field of Classification Search
USPC ..................................................... 250/341.1
See application file for complete search history.

(56) References Cited

U.S. PATENT DOCUMENTS

| | | |
|---|---|---|
| 5,220,463 A | 6/1993 | Edelstein et al. |
| 7,214,940 B2 * | 5/2007 | Cluff et al. ............... 250/341.1 |
| 7,899,281 B2 | 3/2011 | Beselt |
| 2009/0302223 A1 | 12/2009 | Tamada et al. |

FOREIGN PATENT DOCUMENTS

JP 2008-020268 A 1/2008

OTHER PUBLICATIONS

Stoik et al., "Nondestructive evaluationof aircraft compsites using reflective erahertz time domain spectroscopy," 2010, NET&E International, vol. 43, pp. 106-115.*

Schrock, "Terahertz-Spektroskopie", Dissertation presented by Konstanze Schrock, May 2008.
Feldstein et al., "Rapid-scan pump-probe spectroscopy with high time and wave-number resolution: optical-Kerr-effect measurement of neat liquids", Opt. Society, Aug. 1, 1995, vol. 12, No. 8, pp. 1500-1510.
Jain et al., "Simple distortion-free real-time optical pulse correlator", Applied Optics, Nov. 15, 1982, vol. 21, No. 22, pp. 4073-4076.
Shimosato et al., "Ultrabroadband THz spectroscopy using rapid scanning method", Physica Status Solidi, Nov. 1, 2006, vol. 3, No. 10, pp. 3484-3487.
European Search Report dated Nov. 29, 2012 received in application No. EP 12 17 4331.

* cited by examiner

*Primary Examiner* — Kiho Kim
(74) *Attorney, Agent, or Firm* — Maschoff Brennan

(57) ABSTRACT

Time-domain measurements are carried out using arrangements and methods. A transmitter generates electro-magnetic pulses upon receipt of pulses of an optical pulse source. A coherent detector detects the electro-magnetic pulses or an evoked electro-magnetic signal. A delay line periodically changes the optical path length between the optical pulse source and the coherent detector and/or the electro-magnetic transmitter by periodically moving an optical element of the delay line. A position sensor determines the position of the optical element and smoothes the data generated by the position sensor. The coherent detector detects the electro-magnetic signal evoked by the electro-magnetic pulses. Pulses of the optical pulse source trigger the coherent detector. The time-dependency of the electro-magnetic pulses and/or of the electro-magnetic signal evoked by the electro-magnetic pulses are determined using signals of the coherent detector upon receipt of the electro-magnetic pulses and/or of the electro-magnetic signal and the smoothed position sensor data.

20 Claims, 4 Drawing Sheets

METHOD AND ARRANGEMENT FOR CARRYING OUT TIME-DOMAIN MEASUREMENTS

BACKGROUND

Time-domain spectroscopy using, for example, terahertz radiation is known in the art, wherein in a first step the time dependence of a terahertz pulse (i.e. the pulse shape) is determined, i.e. the terahertz pulse is traced in the time domain. Subsequently, a frequency spectrum is generated by applying a Fourier transformation to the determined pulse shape. In order to determine the pulse shape, the terahertz pulse is sampled, for example, using an optical delay line. For example, the optical delay line comprises a step motor for discretely moving an optical element and thus successively changing the optical path length (i.e. the delay time) provided by the delay line. A position sensor is used to measure the actual position of the optical element with µm precision to determine the corresponding delay time on a femtosecond scale. Further, the amplitude of the terahertz pulse is measured step-by-step at a plurality of positions of the optical element using lock-in technique which results in a rather long measurement time.

Faster data acquisition can be realized by generating a continuous periodic movement of the optical element of the delay line, wherein the actual position of the optical element is also measured by means of a position sensor. However, the precision of the measurement of the position of the continuously moving optical element (i.e. of the delay time) appears to be more limited than for measurements with stopped delay lines.

SUMMARY

It is an object of the invention to provide a method and an arrangement for carrying out fast and still precise time-domain measurements, in particular in the terahertz regime.

According to the invention, a method for carrying out fast and precise time-domain measurements, in particular terahertz time-domain measurements, is provided, comprising the steps of:
a) providing an optical pulse source and a transmitter which generates electro-magnetic pulses (pulsed electro-magnetic radiation, e.g. terahertz pulses) upon receipt of pulses of the optical pulse source;
b) providing a coherent detector for detecting the electro-magnetic pulses and/or an electro-magnetic signal (electro-magnetic radiation, e.g. in the form of a terahertz signal) evoked by the electro-magnetic pulses;
c) providing a delay line periodically changing the optical path length between the optical pulse source and the coherent detector and/or between the optical pulse source and the transmitter by periodically moving an optical element of the delay line;
d) determining the position of the optical element using a position sensor;
e) smoothing the data generated by the position sensor;
f) detecting the electro-magnetic signal evoked by the electro-magnetic pulses using the coherent detector, wherein pulses of the optical pulse source are used to trigger the coherent detector; and
g) determining the time-dependency of the electro-magnetic pulses and/or of the electro-magnetic signal evoked by the electro-magnetic pulses using signals generated by the coherent detector upon receipt of the electro-magnetic pulses and/or of the electro-magnetic signal and the smoothed position sensor data.

The electro-magnetic pulses may be terahertz pulses generated using a terahertz transmitter, which, for example, comprises a semiconductor chip comprising a photoconductor and a terahertz antenna. The optical pulses of the optical pulse source are radiated onto the photoconductive antenna, wherein the antenna emits terahertz pulses when hit by the optical pulses. Similarly, the coherent detector may comprise a photoconductor and a terahertz antenna, wherein the detector becomes active (i.e. ready to produce a photocurrent upon receipt of terahertz radiation) when hit by a pulse of the optical pulse source. It is noted, however, that the invention is not restricted to terahertz measurements. Rather, electro-magnetic radiation of another wavelength range could be generated by the transmitter and detected by the detector; e.g. wavelengths in the infrared region.

The electro-magnetic pulses may be used for spectroscopic measurements, wherein the electro-magnetic pulses may be directed onto a sample, wherein a portion of the electro-magnetic pulses is transmitted and/or reflected through (at) the sample and registered by the coherent detector (wherein the portion of the electro-magnetic pulses transmitted and/or reflected at the sample may be the electro-magnetic signal "evoked by the electro-magnetic pulses"). Possible applications, for example, are in the field of plastic or paper production, non-destructive testing (e.g. in addition to ultrasonic methods), general science, pharmacology or security (e.g. detection of explosives, for example in mail pieces). It is also possible that the sample is the transmitter, i.e. optical pulses of the pulse source excite pulsed electro-magnetic radiation of the sample, which is detected by the detector.

In order to obtain the frequency spectrum of the evoked (pulsed) electro-magnetic signal, the signal is sampled using an optical delay line, wherein the precision of the measurement of the position of the optical element (i.e. of the current path length change and thus of the delay time induced by the delay line) is enhanced by smoothing the data generated by the position sensor.

In particular, the optical element of the delay line carries out a smooth movement, e.g. a uniform, inertial movement essentially without jerking. Jerks appearing in the position sensor data thus can be attributed, for example, to the limited resolution of the position sensor, systematic or statistical errors, or to rounding errors due to the analogue-digital converter (femtosecond accuracy may require a precision of 0.3 µm in optical path length). Smoothing over the jerks in the position sensor data results in an improved time scale, for example, even better than a position sensor can give in the conventional step-by-step (stopped) mode (where the optical element of the delay line is not moved according to a uniform, inertial movement).

The smoothing can be done by filtering the data of the position sensor using a low-pass filter. For example, distortions of higher frequencies are eliminated from the position sensor data or at least reduced. In particular, the cut-off frequency of the low-pass filter is set dependent on an estimate of the time-dependent function according to which the optical element is moved, wherein the course of the time-dependent function may be estimated taking into account the construction of an actuator for moving the optical element, see below.

In other words, the accuracy of the measurement of the delay time is high, although the position of the optical element and the amplitude of the evoked electro-magnetic signal (or an equivalent value such as the photocurrent of the coherent detector) are measured during the continuous movement of the optical element of the delay line (i.e. the optical element is not stopped for carrying out the position and the amplitude measurement).

Thus, although a fast measurement can be realized, the precision of the measurement may even be improved. In particular, the invention may permit to determine the position of the optical element even with higher accuracy than using the conventional step-by-step movement of the optical element (as already mentioned above) such that a method is provided that may permit faster and still more accurate, e.g. terahertz, spectroscopic measurements. Also, the achievable dynamic range of the measurements may be increased.

Also, outer conditions (e.g. the temperature) may have an influence on the optical path length between the optical pulse source and the transmitter and/or the detector. These environmental effects will be reduced by the short measurement time provided by the method according to the invention.

It is noted that in time-domain measurement the accuracy with which the delay time is determined is as important as the wavelength accuracy in conventional spectroscopic measurements. For example, an accuracy of the delay time measurement of 1 fs requires a precision of the measurement of the position of the optical element (in air) of about 0.3 μm.

According to an embodiment of the invention, the smoothing according to step d) is carried out using position sensor data acquired during a single period of the periodic motion of the optical element (i.e. during a single pulse train used to sample the pulsed electro-magnetic signal). In particular, a value dependent on the amplitude of the electro-magnetic signal (such as the photocurrent of the detector) is measured for a plurality of different optical path lengths, i.e. for a plurality of different positions of the optical element; for example, at at least 100 positions or at least 500 positions of the optical element during one period of its periodic motion. The oscillation frequency of the optical element may be more than 1 Hz, for example at least 10 Hz or at least 100 Hz, wherein, for example, the overall duration of a measurement (i.e. the time needed for acquiring a spectrum) may not exceed 1 s, 0.1 s or 0.01 s.

In particular, a value dependent on the amplitude of the electro-magnetic signal and a corresponding position of the optical element of the delay line are measured simultaneously, in particularly using a real-time processor. That is, the value dependent on the amplitude of the electro-magnetic signal (the "amplitude value") is measured directly, i.e. without using the lock-in technique integrating and thus "smearing" the amplitude value over a certain period of time and in particular without averaging over several pulse trains (i.e. several oscillations of the optical element).

The signal-to-noise ratio and/or the dynamic range of the measurement may be improved later by averaging over a plurality of pulse trains. For this, the shape of several electro-magnetic signals is measured (i.e. the measurement extends over several periods of the motion of the optical element of the delay line) and the measured pulse shapes are averaged. In addition or as an alternative, a Fourier transformation is applied to measured pulsed electro-magnetic signals and the spectra obtained by this transformation are averaged.

As already set forth above, the delay line may be configured in such a way that a fast but uniform (smooth) motion of the optical element is generated. In particular, a motion of the optical element is produced that does not comprise jerky movements. For example, the optical element is linearly moved, wherein the time-dependent function according to which the optical element is moved may be a harmonic function.

In particular, the optical element is moved along (e.g. in) an optical axis of the delay line. A linear movement in the direction of the optical beam in the delay line may be advantageous because this ensures that the optical beam always hits the same part of the optical element (e.g. a reflector). This is different from rotating mirrors, where the beam is reflected at various surface positions and where any mechanical deviation from planarity or from a planned/designed curvature converts into a timing error.

In another example of the invention, the motion of the optical element can be described by a harmonic function comprising a plurality of higher harmonics, wherein the cut-off frequency of the low-pass filter is set in such a way that frequencies higher than the frequency of a harmonic of order 6, of order 4 or of order 3 are eliminated. The cut-off frequency will be chosen dependent on the number of harmonics describing the actual smooth motion best.

The invention is also related to an arrangement for time-domain measurements, in particular terahertz time-domain measurements, comprising
a) an optical pulse source;
b) a transmitter generating electro-magnetic pulses upon receipt of pulses of the optical pulse source;
c) a coherent detector for detecting the electro-magnetic pulses and/or an electro-magnetic signal evoked by the electro-magnetic pulses, wherein pulses of the optical pulse source are used to trigger the coherent detector;
d) a delay line configured for periodically changing the optical path length between the optical pulse source and the coherent detector and/or between the optical pulse source and the electro-magnetic transmitter by periodically moving an optical element of the delay line (for example, according to a smooth motion;
e) a position sensor for determining the position of the optical element;
f) a smoothing unit for smoothing the data generated by the position sensor; and
g) a device for determining the time dependency of the electro-magnetic pulses and/or of the electro-magnetic signal evoked by the electro-magnetic pulses using signals generated by the coherent detector upon receipt of the electro-magnetic pulses and/or of the electro-magnetic signal and the smoothed position sensor data generated by the smoothing unit.

The arrangement according to the invention may comprise a first optical waveguide (e.g. a flexible optical fibre) via which the optical pulses generated by the optical pulse source are transmitted to the delay line and/or a second optical waveguide via which optical pulses exiting the delay line are transmitted to the detector. That is, the arrangement at least partially is realized by a fibre system. The optical pulse source may be a pulsed laser emitting, for example, at a wavelength of 1050 nm, 1300 nm or 1550 nm.

The optical element may comprise at least one reflecting element; for example multiple (e.g. two) reflecting surfaces or a prism assembly. However, the principle setup of optical delay lines and their movable optical components are known in the art such that the configuration of the optical element is not discussed in more detail.

According to a further embodiment of the invention, the delay line comprises an actuating device for linearly moving the optical element. In particular, the actuating device is configured in such way that is produces a smooth motion of the optical element essentially without any jerky movements as already discussed above. The moving optical element(s) are, in particular, connected via at least one spring and/or other resilient parts) to a fixed frame, wherein the spring may provide guidance and/or excites an oscillation of the optical element. In particular, the actuating device is configured for linearly moving the optical element along an optical axis of a free beam passage (e.g. an input axis) of the delay line. For example, the movement of the optical element is generated in such a way that the position of the spot where the optical beam propagating in the free beam passage of the delay line hits the optical element is essentially constant.

The actuating device, for example, is configured for electro-magnetically moving the optical element (e.g. according to the "voice coil" principle). In another example, the actuating device comprises an oscillatory element interacting with the optical element, wherein the oscillatory element in particular is configured and arranged in such a way that it can carry out a smooth (in particular jerk-free) oscillating movement. Further, the actuator comprises a device for periodically exciting an oscillation of the oscillatory element. For example, the device comprises a rotatable element (e.g. an eccentric disc), wherein the rotational movement of the rotatable element is transferred to the oscillatory element via a flexible element (e.g. a flexible connecting rod or another flexible and/or resilient member such as a spring) such that an excited linear oscillating motion of the oscillatory element is not obstructed. In other words, the oscillation of the oscillatory element is excited but not defined by the rotation of the rotatable element.

The oscillatory element is coupled to the optical element such that its linear oscillating motion is transferred to the optical element, thereby generating the smooth movement of the optical element.

Further, the oscillatory element may be mounted via a resilient element (e.g. also realized by a spring or another resilient component); for example, using a spring that surrounds the oscillatory element.

BRIEF DESCRIPTION OF THE DRAWINGS

Embodiments of the invention will be described in more detail hereinafter with reference to the drawings, in which.

DETAILED DESCRIPTION OF THE DRAWINGS

Figure 1:
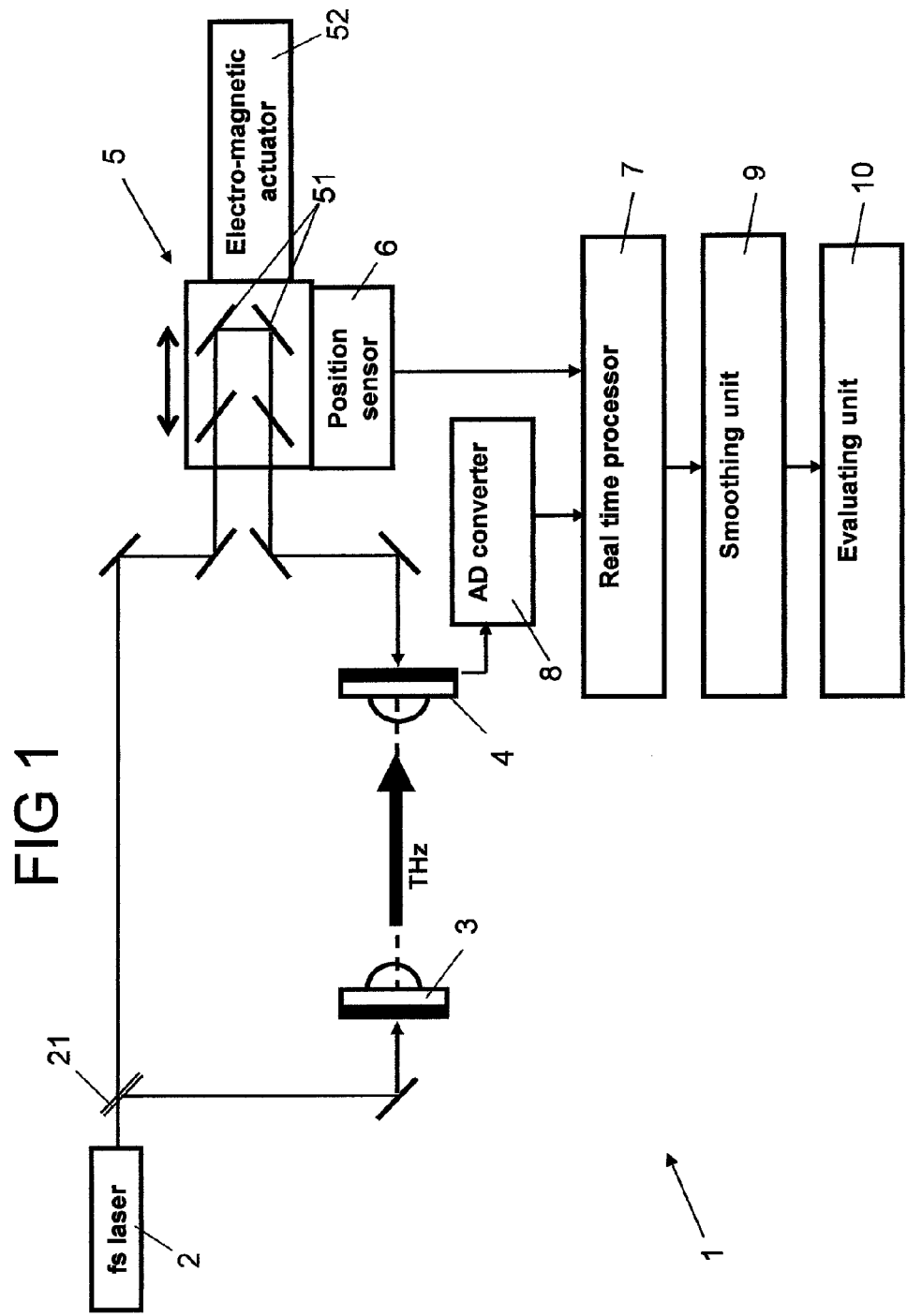
FIG. 1 schematically illustrates an arrangement for terahertz time-domain measurements according to an embodiment of the invention.

FIG. 1 shows a terahertz time-domain measurement (spectroscopy) arrangement 1 according to the invention comprising an optical pulse source in the form of a femtosecond laser 2 and a terahertz transmitter 3 (comprising, for example, a photoconducting antenna). Optical pulses of femtosecond laser 2 are reflected onto the terahertz transmitter 3 which thereupon generates terahertz pulses (indicated by arrow "THz").

A terahertz signal (e.g. in the form of modified terahertz pulses) evoked by the terahertz pulses emitted by (non-modulated) transmitter 3 is detected by a coherent terahertz detector 4, which may be realized similar to the transmitter 3. The terahertz pulses generated by the terahertz transmitter 3 may be used to interact with a sample (not shown), wherein the interaction with the sample may evoke a modified (pulsed) terahertz signal which is detected by the terahertz detector 4.

Using a beam splitter 21, a part of the radiation generated by the femtosecond laser 2 is transmitted towards the terahertz detector 4 to trigger the detector 4, i.e. the terahertz signal (e.g. its amplitude) evoked by the terahertz pulses of transmitter 3 is measured each time an optical pulse hits the terahertz detector 4. The optical pulses of the femtosecond laser 2 could be supplied to the terahertz transmitter 3 and/or to the terahertz detector 4 via optical waveguides (in particular, optical fibres).

In order to determine the time-dependency (the pulse shape) of the terahertz signal, the optical path length along which the optical pulse travels from the femtosecond laser 2 to the terahertz detector 4 is periodically changed using an oscillating delay line 5. Thus, the terahertz signal arriving at the coherent detector 4 can be traced in time (analogous to a "pump and probe" measurement).

Figure 3:
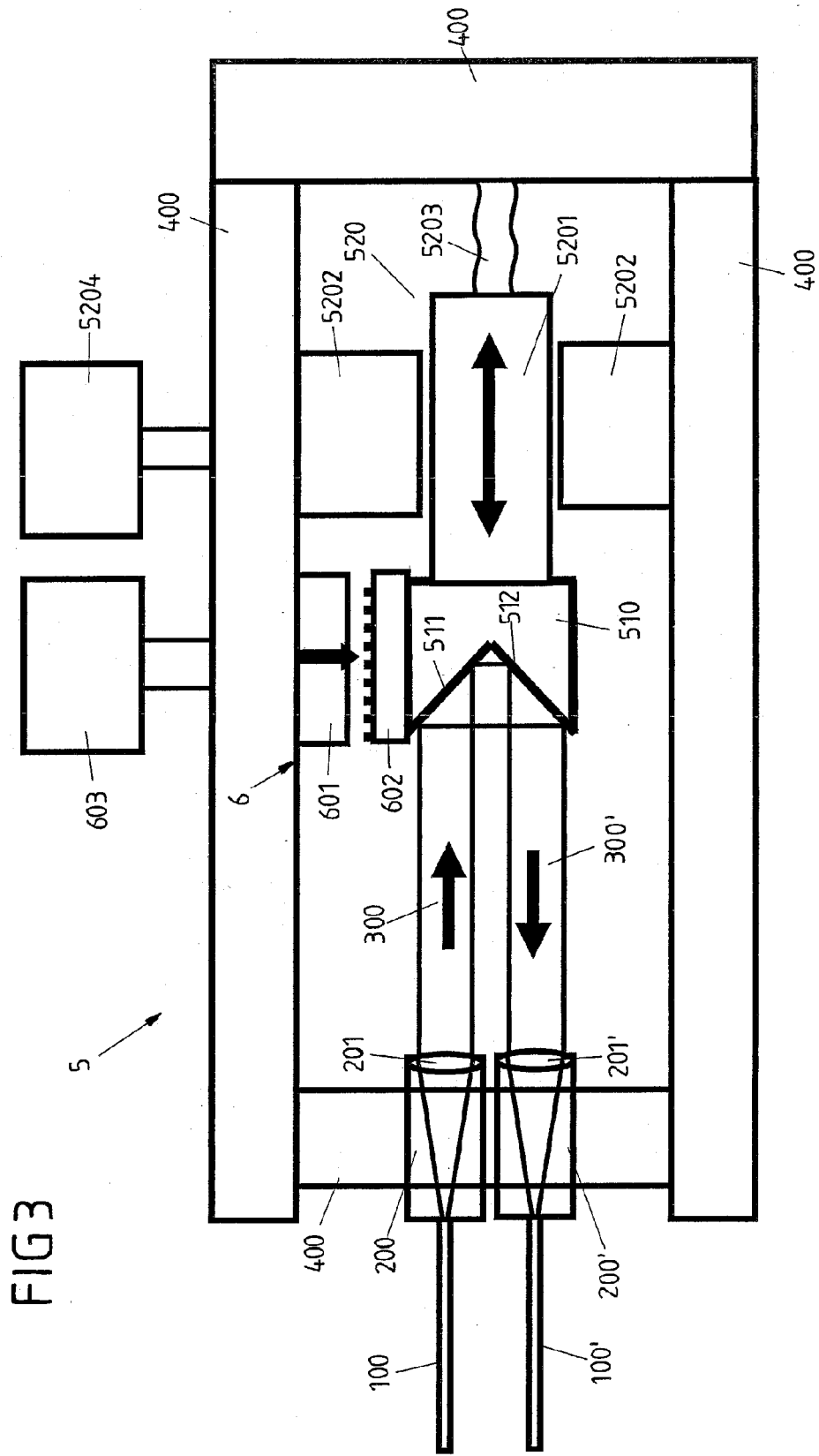
FIG. 3 illustrates a first realization of a delay line of an arrangement for terahertz time-domain measurements according to an embodiment of the invention.
Figure 4:
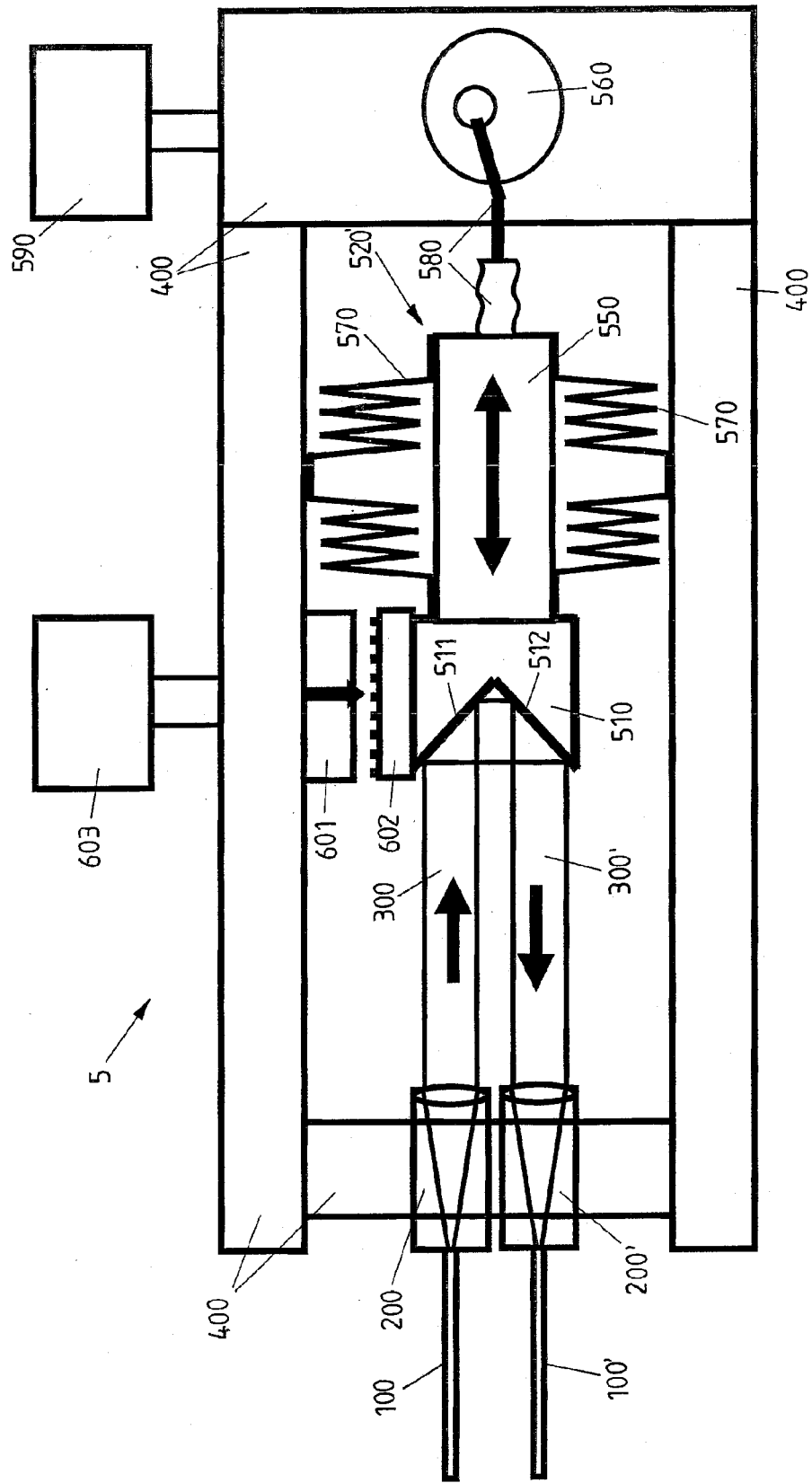
FIG. 4 illustrates a second realization of a delay line of an arrangement for terahertz time-domain measurements according to an embodiment of the invention.

The delay line 5, for example, has a free-beam configuration, wherein an optical element 51 comprising two reflective surfaces is linearly moved forward and backward such that the change of the optical path length induced by delay line 5 varies periodically. The movement of the optical element 51 is generated by an actuating unit 52, wherein, in particular, the optical element 51 carries out an essentially free linear movement, i.e. the movement (position of the optical elements or optical path length change over time) can be described by a harmonic function such as a sine function. Examples of possible delay line configurations are discussed below (FIGS. 3 and 4).

Figure 2:
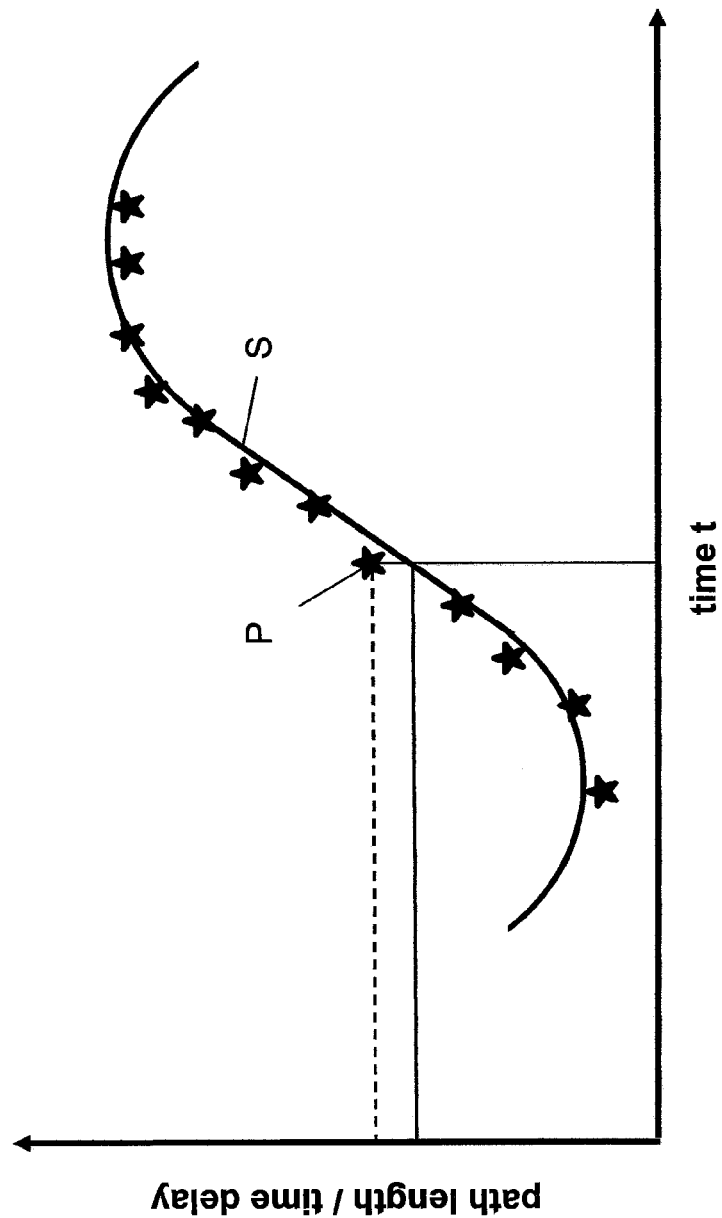
FIG. 2 depicts the path length change measured by a position sensor over time.

The actual position of the optical element 51 and thus the actual delay time induced by the delay line 5 is measured using a position sensor 6. In particular, the position sensor 6 is configured to determine the position of the optical element 51 at several points in time during one period of its oscillation. For example, the position sensor 6 registers at least 100 positions during one period of the motion of the optical element 51. An example of data (i.e. the position of the optical element 51 and the delay time, respectively) registered by the position sensor 6 for several points in time during one oscillation period are depicted in FIG. 2.

For tracing the pulsed terahertz signal, the photo current (corresponding to the amplitude of the pulsed terahertz signal) produced by the terahertz detector 4 is registered for several (for example, at least 100 as set forth above) different position of the optical element 51, wherein the position of the optical element (i.e. the delay time) is measured simultaneously with the photo current of detector 4. For example, data rates of at least 10 kSa/s, in particular 100 kSa/s, are used. The simultaneous registration of both the delay time and the detector photo current is carried out by using a real-time processor 7 to which the output of the position sensor 6 and the output of the coherent detector 4 (via an analog-digital converter 8) are fed. Using these data, the time dependency of the terahertz signal (e.g. the amplitude or equivalent data such as the photo current generated by terahertz detector 4 over time) is determined. For example, the delay time between the registration of the position of optical element 51 and the detector photo current is less than 1 µs, in particular around 0.2 µs.

It is noted that the delay line 5, in principle, could also be arranged between the femtosecond laser 2 and the terahertz transmitter 3. Also, the delay line 5 could be connected to the terahertz detector 4 via an optical fibre.

According to the invention, an improved determination of the time delay induced by the delay line 5 is provided. For this, the terahertz time-domain spectroscopy arrangement 1 comprises a smoothing unit 9 that smoothes the data generated by the position sensor 6. That can be realized, for example, by means of a low-pass filter, wherein the cut-off frequency of the low-pass filter is set dependent on an estimate of the time-dependent function which governs the movement of the optical element 51 of the delay line 5. In particular, smoothing unit 9 carries out a (e.g. software implemented) low-pass filter function. By means of the low-pass filter, for example, higher frequency distortions contained in the (time dependent) sensor data are reduced or eliminated, in particular by cutting off the corresponding frequencies of a Fourier transformation and transforming the filtered data back into the time domain.

The arrangement 1 further comprises a device 10 for determining the time dependency of the terahertz signal using the smoothed position data generated by smoothing unit 9. Using the smoothing technique according to the invention, the variation in time of the complete terahertz signal (pulse) may for example be determined during a single period of the delay line oscillations (i.e. by measuring a single pulse train, only). However, it is also possible that the measurement is carried out for a plurality of periods of the motion of the optical element (i.e. over several pulse trains) to obtain several measurement of the terahertz signal, wherein the measurement are. Device 10 may also be configured to transform the measured pulse shapes into the frequency domain and to average the obtained frequency spectra.

As already mentioned above, FIG. 2 illustrates values of the path length change (i.e. the time delay) produced by the delay line 5 at different points in time (x-axis) during an oscillation of the optical elements 51, wherein the values P of the path length change corresponding to different positions of the optical element 51 were measured by the position sensor 6. As already set forth above, the position values (y-axis) are smoothed using a low-pass filter with a suitable cut-off frequency such that the position values are smoothed and therefore approach a function (continuous line S) which governs the motion of the optical element 51 of the delay line 5.

An embodiment of a delay line 5 that could be used in the time-domain measurement arrangement 1 shown in FIG. 1 is illustrated in FIG. 3. Optical pulses produced by an optical pulse source such as the femtosecond laser 2 in FIG. 1 are fed to the delay line 5 via an optical fibre 100 connected to an input port 200 of the delay line. Correspondingly, the delay line 5 comprises an optical output port 200' coupled to an optical fibre 100' connecting the delay line 5 to a terahertz detector such as the coherent detector 4 in FIG. 1. The input port and the output port 200, 200' each comprises a collimator 201, 201', wherein the collimator 201 of the input port transfers the incoming fibre mode into an expanded beam 300 and the collimator 201' of the output port transfers an expanded beam 300' propagating in the delay line 5 into a fibre mode.

Further, the delay line 5 comprises an optical element 510 having two reflecting surfaces 511, 512 for reflecting beam 300. Of course, other optical elements could be used for reflecting beam 300 such as a prism or several prisms. The optical element 510 is moved linearly by an actuator 520, wherein the actuator 520 generates an oscillating forward and backward movement of the optical element 510 along a direction parallel to the direction of beam 300. In particular, the spot where the beam 300 hits the upper reflecting surface remains essentially the same during the linear movement of the optical element 510. Thus, the actuator 520 is configured to generate a smooth ("free") movement of the optical element 510 such that the motion of the optical element 510 could, for example, be described by a harmonic function.

In order to be able to produce such a motion of the optical element 510, the actuator 520 is configured to electro-magnetically move the optical element 510. More particularly, the actuator 520 uses the voice-coil principle, wherein it comprises a magnetic core 5201 connected to the optical element and a coil 5202 whose electromagnetic field drives the magnetic core 5201. The magnetic core 5201 is mounted via a spring 5203 arranged on a side of the magnetic core 5201 that faces away from the optical element 510 and is connected to the magnetic core 5201 with one end and to a frame 400 of the delay line 5 with another end. The electro-magnetic actuator 520 is driven by a control unit 5204.

For measuring the positions of the optical element 510 and thus the change of the optical path (i.e. the time delay) induced by the delay line 5, a position sensor 6 is provided. The position sensor 6 comprises a position reader 601 fixed to frame 400 and a position scale 602 fixed to the optical element 510. The position sensor 6 is operated by a position sensor control unit 603.

The frame 400 of the delay line 5 encloses the optical element 510, the position sensor 6 and the actuator 520. The control unit 5204 and the position sensor control unit 603 may be arranged outside the frame 400.

An alternative configuration of the actuator used for moving the optical element 510 is depicted in FIG. 4, wherein the other components of the delay line are identical to the corresponding components shown in FIG. 3. According to FIG. 4, an actuator 520' is provided that comprises an oscillatory element 550 (e.g. a rod, a spring or another resilient element) and a device for periodically exciting a linear oscillation of the oscillatory element 550. The device comprises a rotatable element in the form of an eccentric disc 560, wherein the first end of the oscillatory element 550 is connected to the optical element 510 and its second end is connected to via a flexible element 580.

The flexible element 580 transforms the rotational motion of the eccentric disc 560 into a motion that excites a smooth linear oscillation of the oscillatory element 550 and therefore of the optical element 510. The flexible member 580 ensures that jerky movements of the actuator mechanics (in particular of the eccentric disc 560) are not converted into jerky movements of the oscillatory element and thus the optical element 510. Rather, by means of the eccentric disc 560 and the flexible element 580 the actuator periodically excites the oscillations of the optical element 510. The oscillatory element 550 is mounted via guiding resilient elements 570 (e.g. a spring or multiple springs) arranged between an outer circumference of core 550 and the frame 400.

The eccentric disc 560 is driven by a motor such as an electric motor (not shown), wherein a motor control unit 590 may be arranged.

REFERENCE SIGNS

| | |
|---|---|
| 1 | arrangement for terahertz time-domain measurements |
| 2 | femtosecond laser |
| 3 | terahertz transmitter |
| 4 | coherent detector |
| 5 | delay line |
| 6 | position sensor |
| 7 | real-time processor |
| 8 | analog-digital converter |
| 9 | smoothing unit |
| 10 | evaluating unit |
| 21 | beam splitter |

-continued

| | |
|---|---|
| 51, 510 | optical element |
| 52 | actuating unit |
| 100, 100' | optical fibre |
| 200 | input port |
| 200' | output port |
| 201, 201' | collimator |
| 300, 300' | beam |
| 511, 512 | reflecting surface |
| 520, 520' | actuator |
| 550 | oscillating element |
| 560 | eccentric disc |
| 570 | resilient element |
| 580 | flexible member |
| 590 | motor control unit |
| 601 | position reader |
| 602 | position scale |
| 603 | position sensor control unit |
| 5201 | magnetic core |
| 5202 | coil |
| 5203 | spring |
| 5204 | control unit |

The invention claimed is:

1. A method for carrying out time-domain measurements, comprising the steps of:
   a) providing an optical pulse source and a transmitter which generates electro-magnetic pulses upon receipt of pulses of the optical pulse source;
   b) providing a coherent detector for detecting the electro-magnetic pulses and/or an electro-magnetic signal evoked by the electro-magnetic pulses;
   c) providing a delay line periodically changing the optical path length between the optical pulse source and the coherent detector and/or between the optical pulse source and the transmitter by periodically moving an optical element of the delay line;
   d) determining the position of the optical element using a position sensor;
   e) smoothing the data generated by the position sensor;
   f) detecting the electro-magnetic signal evoked by the electro-magnetic pulses using the coherent detector, wherein pulses of the optical pulse source are used to trigger the coherent detector; and
   g) determining the time-dependency of the electro-magnetic pulses and/or of the electro-magnetic signal evoked by the electro-magnetic pulses using signals generated by the coherent detector upon receipt of the electro-magnetic pulses and/or the electro-magnetic signal and the smoothed position sensor data.

2. The method as claimed in claim 1, wherein the transmitter generates terahertz pulses upon receipt of pulses of the optical pulse source and wherein a terahertz signal evoked by the terahertz pulses is detected by the transmitter.

3. The method as claimed in claim 1, wherein the smoothing according to step e) comprises filtering the sensor position data by means of a low pass filter, wherein, in particular, the cut-off frequency of the low-pass filter is set dependent on an estimate of a time-dependent function according to which the optical element is moved.

4. The method as claimed in claim 1, wherein the filtering according to step e) is carried out using position sensor data acquired during a single period of the periodic motion of the optical element.

5. The method as claimed in claim 1, wherein the optical element of the delay line is moved in such a way that it carries out a smooth movement essentially without jerking.

6. The method as claimed in claim 1, wherein step g) comprises that a value dependent on the amplitude of the electro-magnetic signal and a corresponding position of the optical element of the delay line are measured simultaneously, in particular using a real-time processor.

7. The method as claimed in claim 1, wherein the optical element is linearly moved, wherein, in particular, the optical element carries out a movement in the optical axis of the delay line.

8. The method as claimed in claim 1, wherein the optical element is moved in such a way that its motion can be approximated by a harmonic function.

9. The method as claimed in claim 8, wherein the motion of the optical element can be described by a harmonic function comprising a plurality of higher harmonics, wherein the cut-off frequency of the low-pass filter is set in such a way that frequencies higher than the frequency of a harmonic of order 6, of order 4 or of order 3 are eliminated.

10. Arrangement for time-domain measurements, comprising
    a) an optical pulse source;
    b) a transmitter generating electro-magnetic pulses upon receipt of pulses of the optical pulse source;
    c) a coherent detector for detecting the electro-magnetic pulses and/or an electro-magnetic signal evoked by the electro-magnetic pulses, wherein pulses of the optical pulse source are used to trigger the coherent detector;
    d) a delay line configured for periodically changing the optical path length between the optical pulse source and the coherent detector and/or between the optical pulse source and the transmitter by periodically moving an optical element of the delay line;
    e) a position sensor for determining the position of the optical element;
    f) a smoothing unit or smoothing the data generated by the position sensor; and
    g) a device for determining the time dependency of the electro-magnetic pulses and/or of the electro-magnetic signal evoked by the electro-magnetic pulses using signals generated by the coherent detector upon receipt of the electro-magnetic pulses and/or of the electro-magnetic signal and the smoothed position sensor data generated by the smoothing unit.

11. The arrangement as claimed in claim 10, wherein the transmitter is a terahertz transmitter generating terahertz pulses upon receipt of pulses of the optical pulse.

12. The arrangement as claimed in claim 10, further comprising a first optical waveguide via which the optical pulses generated by the optical pulse source are transmitted to the delay line and/or a second optical waveguide via which optical pulses exiting the delay line are transmitted to the coherent detector and/or the transmitter.

13. The arrangement as claimed in claim 10, wherein the delay line comprises an actuating device for linearly moving the optical element.

14. The arrangement as claimed in claim 13, wherein the actuating device is configured for generating an essentially free linear movement of the optical element.

15. The arrangement as claimed in claim 13, wherein the actuating device is configured for linearly moving the optical element along an optical axis of the delay line.

16. The arrangement as claimed in claim 13, wherein the optical element is connected to a fixed frame via a resilient element.

17. The arrangement as claimed in claim 13, wherein the actuating device is configured for electro-magnetically moving the optical element.

18. The arrangement as claimed in claim 13, wherein the actuating device comprises an oscillatory element connected to the optical element and a device for periodically exciting a linear oscillation of the oscillatory element, the device in particular comprising a rotatable element configured and connected to the oscillatory element via a flexible element in such a way that a rotational movement of the rotatable element excites a linear oscillation of the oscillatory element.

19. The arrangement as claimed in claim 10, wherein the optical pulse source may be a pulsed laser emitting, for example, at a wavelength of 1050 nm, 1300 nm or 1550 nm.

20. The arrangement as claimed in claim 10, wherein the optical element may comprise at least one reflecting element.

* * * * *